United States Patent
Fayette et al.

(10) Patent No.: US 12,254,551 B2
(45) Date of Patent: Mar. 18, 2025

(54) METHOD AND APPLICATION FOR ANIMATING COMPUTER GENERATED IMAGES

(71) Applicant: FD IP & LICENSING LLC, Los Angeles, CA (US)

(72) Inventors: Brandon Fayette, Los Angeles, CA (US); Gene Reddick, San Francisco, CA (US)

(73) Assignee: FD IP & LICENSING LLC, Los Angeles, CA (US)

( * ) Notice: Subject to any disclaimer, the term of this patent is extended or adjusted under 35 U.S.C. 154(b) by 0 days.

(21) Appl. No.: 18/310,057

(22) Filed: May 1, 2023

(65) Prior Publication Data

US 2024/0020901 A1    Jan. 18, 2024

Related U.S. Application Data

(60) Provisional application No. 63/368,260, filed on Jul. 13, 2022.

(51) Int. Cl.
*G06T 13/40* (2011.01)
*G06T 7/20* (2017.01)
*G06V 40/16* (2022.01)

(52) U.S. Cl.
CPC ............... *G06T 13/40* (2013.01); *G06T 7/20* (2013.01); *G06V 40/168* (2022.01); *G06V 40/174* (2022.01); *G06T 2207/10016* (2013.01); *G06T 2207/30196* (2013.01)

(58) Field of Classification Search
None
See application file for complete search history.

(56) References Cited

U.S. PATENT DOCUMENTS

| | | |
|---|---|---|
| 5,327,257 A | 7/1994 | Hrytzak et al. |
| 6,243,791 B1 | 6/2001 | Vondran, Jr. |
| 7,693,702 B1 | 4/2010 | Kerner et al. |
| 8,264,505 B2 | 9/2012 | Bathiche et al. |
| 8,743,145 B1 | 6/2014 | Price |
| 8,743,244 B2 | 6/2014 | Vartanian et al. |
| 8,896,629 B2 | 11/2014 | Meier et al. |
| 8,930,577 B2 | 1/2015 | Ostergren |
| 8,937,663 B2 | 1/2015 | Sugden |
| 8,943,420 B2 | 1/2015 | Goldthwaite et al. |
| 8,953,022 B2 | 2/2015 | McArdle et al. |
| 9,030,492 B2 | 5/2015 | Bischoff et al. |
| 9,070,216 B2 | 6/2015 | Golparvar-Fard et al. |
| 9,122,321 B2 | 9/2015 | Perez et al. |
| 9,164,577 B2 | 10/2015 | Tapley et al. |
| 9,196,094 B2 | 11/2015 | Ur |

(Continued)

FOREIGN PATENT DOCUMENTS

| | | |
|---|---|---|
| EP | 2880635 B1 | 10/2018 |
| WO | 2023280623 A1 | 1/2023 |

OTHER PUBLICATIONS

Lee et al., "Generating Animatable 3D Virtual Humans from Photographs" (Year: 2000).*

(Continued)

*Primary Examiner* — Hilina K Demeter
(74) *Attorney, Agent, or Firm* — Vorys, Sater, Seymour and Pease LLP; Rex W. Miller, II

(57) ABSTRACT

This disclosure relates to digital asset animation.

15 Claims, 6 Drawing Sheets

(56) References Cited

U.S. PATENT DOCUMENTS

| | | | |
|---|---|---|---|
| 9,215,293 B2 | 12/2015 | Miller | |
| 9,349,218 B2 | 5/2016 | Keating et al. | |
| 9,361,730 B2 | 6/2016 | Keating et al. | |
| 9,380,177 B1 | 6/2016 | Rao et al. | |
| 9,489,773 B2 | 11/2016 | Damola | |
| 9,495,760 B2 | 11/2016 | Swaminathan et al. | |
| 9,506,744 B2 | 11/2016 | Bridges | |
| 9,589,372 B1 | 3/2017 | Bean et al. | |
| 9,600,933 B2 | 3/2017 | Wu et al. | |
| 9,626,803 B2 | 4/2017 | Park et al. | |
| 9,665,983 B2 | 5/2017 | Spivack | |
| 9,717,981 B2 | 8/2017 | Robbins et al. | |
| 9,721,394 B2 | 8/2017 | Rosenthal et al. | |
| 9,728,007 B2 | 8/2017 | Hakkarainen | |
| 9,728,011 B2 | 8/2017 | Lam | |
| 9,741,170 B2 | 8/2017 | Park et al. | |
| 9,779,550 B2 | 10/2017 | Tobita | |
| 9,792,733 B2 | 10/2017 | Rosenthal et al. | |
| 9,846,972 B2 | 12/2017 | Montgomerie et al. | |
| 10,203,762 B2 | 2/2019 | Bradski et al. | |
| 10,373,342 B1 | 8/2019 | Perez, III et al. | |
| 10,388,070 B2 | 8/2019 | Spivak | |
| 10,594,786 B1 | 3/2020 | Perez, III et al. | |
| 11,030,442 B1* | 6/2021 | Bergamo | G06F 18/214 |
| 2005/0046707 A1 | 3/2005 | Takane | |
| 2007/0260984 A1* | 11/2007 | Marks | A63F 13/65 |
| | | | 715/706 |
| 2010/0007665 A1* | 1/2010 | Smith | G06T 13/40 |
| | | | 345/473 |
| 2010/0060722 A1* | 3/2010 | Bell | G06T 13/40 |
| | | | 348/E13.001 |
| 2010/0238168 A1* | 9/2010 | Kim | G06T 7/20 |
| | | | 382/154 |
| 2011/0007079 A1* | 1/2011 | Perez | A63F 13/56 |
| | | | 345/473 |
| 2011/0025853 A1* | 2/2011 | Richardson | H04N 23/66 |
| | | | 348/E7.085 |
| 2012/0130717 A1* | 5/2012 | Xu | G06F 3/167 |
| | | | 345/473 |
| 2012/0307102 A1 | 12/2012 | Yuyama | |
| 2015/0248918 A1 | 9/2015 | Tang | |
| 2016/0044343 A1 | 2/2016 | Bost et al. | |
| 2016/0173875 A1 | 6/2016 | Zhang et al. | |
| 2017/0208220 A1 | 7/2017 | Stankoski et al. | |
| 2017/0273639 A1* | 9/2017 | Iscoe | A61B 5/1072 |
| 2018/0270516 A1 | 9/2018 | Dalbec et al. | |
| 2019/0035149 A1* | 1/2019 | Chen | G06V 40/166 |
| 2019/0066365 A1 | 2/2019 | Schmalstieg et al. | |
| 2019/0066387 A1 | 2/2019 | Benjamin et al. | |
| 2019/0082211 A1* | 3/2019 | Vats | G06T 7/215 |
| 2019/0297304 A1* | 9/2019 | Li | H04N 7/157 |
| 2020/0145701 A1 | 5/2020 | Liu et al. | |
| 2021/0192824 A1* | 6/2021 | Chen | G06F 16/43 |
| 2021/0280322 A1* | 9/2021 | Frank | G16H 50/20 |
| 2022/0130115 A1* | 4/2022 | Assouline | G06T 7/20 |
| 2022/0148266 A1* | 5/2022 | Kim | G06V 40/171 |
| 2022/0351751 A1 | 11/2022 | Ocean et al. | |
| 2022/0398795 A1* | 12/2022 | Phan | G06N 3/0475 |
| 2023/0123820 A1* | 4/2023 | Wang | G06N 3/088 |
| | | | 345/474 |
| 2023/0217084 A1 | 7/2023 | Shibata | |

OTHER PUBLICATIONS

International Search Report and Written Opinion mail date Nov. 30, 2021 of PCT/US2021/047327, International Filing Date of Aug. 24, 2021, Applicant FD IP & Licensing LLC, Authorized Officer Kari Rodriquez, Forms PCT/ISA/220, PCT/ISA/210, and PCT/ISA/237, 16 pages.

International Search Report and Written Opinion issued Aug. 16, 2024, for International Application No. PCT/US2024/024852, 47 pages.

Extended European Search Report issued Sep. 3, 2024, in European Patent Application No. 21862562.2, 12 pages.

\* cited by examiner

METHOD AND APPLICATION FOR ANIMATING COMPUTER GENERATED IMAGES

RELATED APPLICATION

This application claims the benefit of U.S. Provisional Patent Application No. 63/368,260, filed Jul. 13, 2022, and entitled "METHOD AND APPLICATION FOR ANIMATING COMPUTER GENERATED IMAGES," which is incorporated herein by reference in its entirety.

FIELD OF THE DISCLOSURE

This disclosure relates to digital asset animation.

BACKGROUND OF THE DISCLOSURE

Video artists currently have the option to supplement their content with digital assets (e.g., computer generated imagery (CGI)). For instance, certain computer applications provide augmented reality filters which, when used, may apply a visual effect to the person being filmed. For example, current filters may add dog-ears or a crown to a user or may morph a user's face to that of a dragon. These filters lack customization and many of the animations associated therewith are canned and limited in showing full body movements and the complex facial expressions of the user. Custom animation of certain computer-generated graphics for video content is difficult and often requires hardware outside of a mobile phone (e.g., a smart phone). Thus, it is desirable to provide a way for video artists to create content that includes custom animation of CGI Characters.

SUMMARY OF THE DISCLOSURE

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of this summary is to present some concepts of the disclosure in a simplified form prior to the more detailed description that is presented hereinafter.

A method can include generating, by a processor, facial data characterizing captured facial features and/or expressions, generating, by the processor, body data characterizing captured body movements, mapping, by the processor, the captured facial features and/or expression and the captured body movements onto a skeleton model, and causing, by the processor, a digital asset to be animated based on the mapping.

In another example, a system can include memory to store machine-readable instructions and data, and one or more processors to access the memory and execute the machine-readable instructions. The machine-readable instructions can include a body capture module to provide facial data characterizing facial features and/or expressions of a subject, a face capture module to provide body data characterizing body movements of the subject, a character module to retrieve a digital asset from a digital asset database and, and a skeleton module to map body movements and/or facial expressions of the subject to the digital asset based on the body and/or facial data to animate the digital asset, wherein augmented video data is generated with the animated digital asset.

In an even further example, a method can include receiving, at a processor, first video signal data characterizing facial features and/or expressions, receiving, at the processor, second video signal data characterizing body movements, extracting, by the processor, the facial features and/or expressions to provide facial data, extracting, by the processor, the body movements to provide body data, mapping, by the processor, the body movements and/or facial features and/or expressions to a skeleton model based on the facial and/or body data to provide an animated skeleton model, and animating, by the processor, a digital asset according to actions of the animated skeleton model to provide an animated digital asset.

BRIEF DESCRIPTION OF THE DRAWINGS

Embodiments are described with reference to the accompanying drawings. In the drawings, like reference numbers can indicate identical or functionally similar elements. The drawing in which an element first appears is generally indicated by the left-most digit in the corresponding reference number.

DETAILED DESCRIPTION

Figure 1:
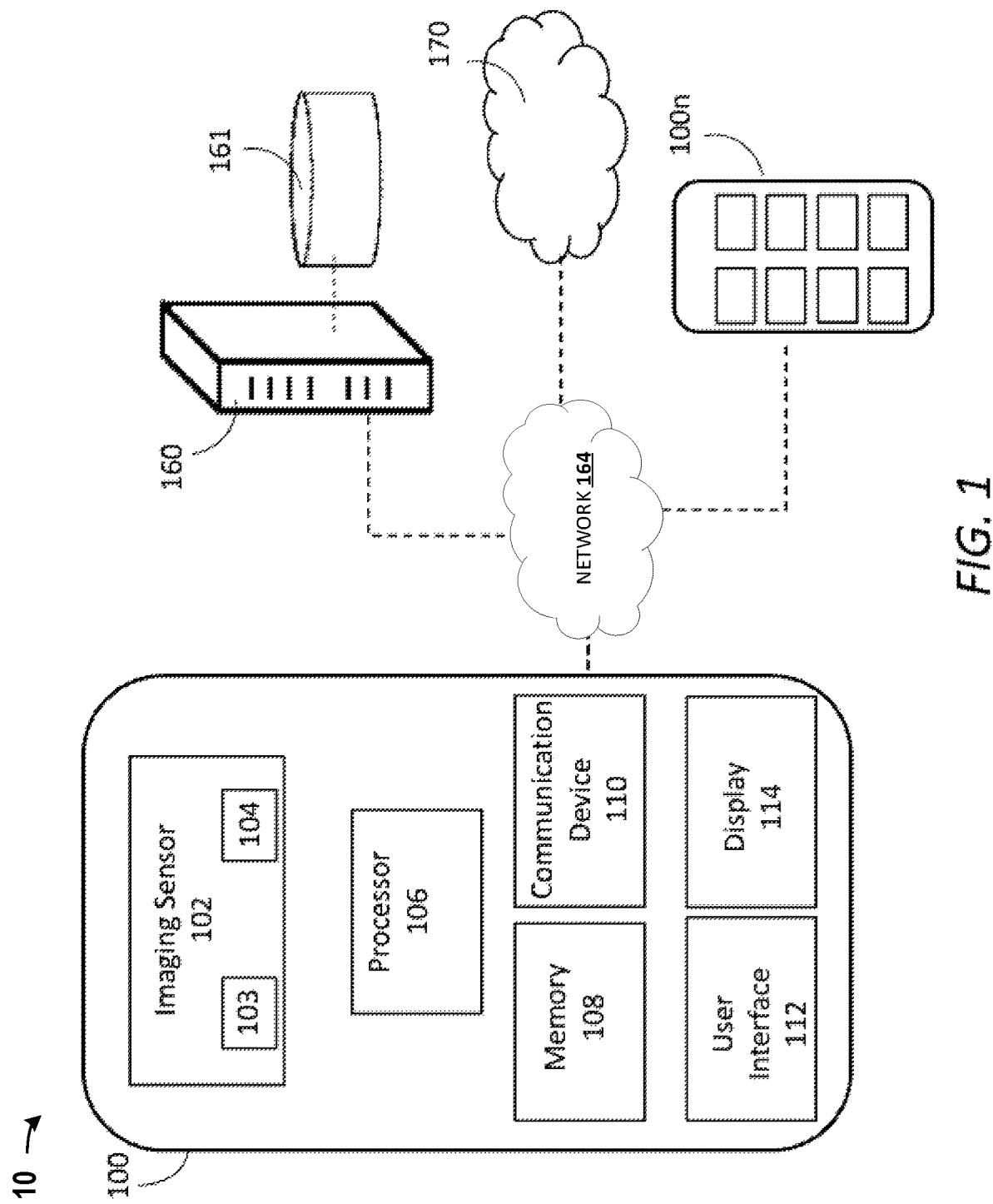
FIG. 1 is a block diagram of an animation system.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Systems and methods examples are disclosed herein for capturing body movements and/or facial expressions of a subject (e.g., an actor) and digital asset generation based on the captured body movements and/or facial expressions. As used herein the terms "facial expressions," or "facial movements" mean movements of facial features (eyes, mouth, nose, skin) on the face of an individual. This includes but is not limited to eye movement, speaking, raising eyebrows, smiling, frowning, emotions, sticking out a tongue, wiggling ears and puffing out one's cheeks. Digital assets can be provided and captured body movements and/or facial expression can be mapped onto the digital asset to animate the digital asset to reflect actions of the digital asset. In some examples, the digital assets can be scaled and mapped to actions of the subject. In some examples, The mapped digital asset can be composited with a video signal allowing a user to view the digital asset on a display. In some examples, body motion and facial expression data (computed based on captured video signal data of the subject) can be saved as collective body data and the digital asset can be mapped at a later time to the collective body data.

Examples are presented herein relating to creation of video clips with digital assets (or augmented video data) and the system and methods described herein can be used in various applications and/or industries, such as a film and/or television industry. Thus, in some examples, techniques/methods, as disclosed herein, for capturing body movements and/or facial expressions of the subject and digital asset generation based on the captured body movements and/or facial expressions can be incorporated into film or industry related video generation systems. For example, previsualization devices and/or systems can be configured to include the systems and/or methods, as disclosed herein for animating computer generated images. One example of such a device/system is described in U.S. patent application Ser. No. 17/410,479, and entitled "Previsualization Devices and Systems for the Film Industry," filed Aug. 24, 2021, which is incorporated herein by reference in its entirety. Accordingly, techniques/methods as disclosed herein can be used in a previsualization device/system to animate an asset based on body movements and/or facial expression during filming or production.

FIG. 1 is a block diagram of an animation system 10 that can be used for providing augmented video content. Augmented video content (or video data) can refer to video footage (captured in real-time or beforehand) that has been enhanced or modified with a digital asset. Thus, the augmented video content can include animated video content (e.g., video footage that has been created using computer graphs, rather than recorded using a camera). In the context of augmented video, animated video data can be used to create virtual objects or characters that interact with the real-world environment captured by the camera. For example, an animated character can be placed in a real-world scene and made to interact with objects or people in the scene, creating the illusion of the character being present in the real world.

In the example of FIG. 1, the animation system 10 includes a mobile device 100 that can be used for creating the augmented video content. Examples are presented herein in which the mobile device 100 is a smartphone, but in other examples the mobile device 100 can be implemented as a tablet, a wearable device, a handheld game console, or as a portable device, such as a laptop. In even further examples, the mobile device 100 can be implemented as a computer, including a desktop computer, or portable computer.

Accordingly, in some examples, the device 100 can include one or more image sensors (denoted generally as image sensor 102) for capturing an environment, a processor 106, and a storage medium/memory 108. The processor 106 can be variously embodied, such as by a single core processor, a dual core processor (or by a multiple core processor), a digital processor and cooperating math coprocessor, a digital controller, a graphics processing unit (GPU), a special-purpose processor, an application specific processor, an embedded processor, and the like. The processor 106 can include a number of processors and each of the processors can include a number of cores. The processor 106 can be configured to control the operations and components of the device 100 and may execute applications, apps, and instructions stored in the memory 108 and/or accessible via a communication device 110. The memory 108 can represent a non-transitory machine-readable memory (or other medium), such as random access memory (RAM), a solid state drive, a hard disk drive, and/or a combination thereof. In some embodiments, the processor 106 and/or memory 108 can be implemented on a single die (e.g., chip), or a number of chips.

The image sensor 102, can be, for example, a charge-coupled device sensor (CCD) or complementary metal-oxide semiconductor sensor (CMOS) configured to capture the environment and provide visual data characterizing the captured environment, for example, as one or more images. The image sensor 102 can be any type of device/system that can capture the environment and provide corresponding visual data. By way of further example, the image sensor 102 can be a camera, an analog, digital, and/or a combination thereof. The image sensor 102 detects and conveys information which is used and stored in memory 108 to make an image or video corresponding to the visual data.

In some examples, the image sensor 102 includes a number of cameras. By way of example, the image sensor 102 includes a first camera 103 and a second camera 104, although in other examples a greater number of cameras can be used. In some examples, the first and second cameras 103 and 104 can be configured (or optimized) for a specific imaging/capturing purpose. Thus, each of the first and second cameras 103 and 104 can be configured for certain applications or are associated with specialty lenses (e.g., macro lenses, ultra-wide lenses, telephoto lenses, wide-angle lenses, etc.). Accordingly, each of the first and second cameras 103 and 104 can be different and have unique features that make it suitable for different types of photography and videography.

In an example, the first camera 103 can be used to capture facial features and/or expressions of a subject, (e.g., actor or person) and provide first video signal data with the facial features and/or expression of the subject captured. The processor 206 can process the first video signal data to extract the captured facial features and/or expressions to provide facial data. The facial data can characterize the captured facial features and/or expression of the subject. That is, in some embodiments, the first camera 103 can have a resolution and/or zoom to capture details about a subject's face from a distance.

In some examples, the second camera 104 can be configured to capture the body of a subject (e.g., feet, head and everything in between) and movements of the subject, which can be provided as second video signal data. The second video signal data can be processed by the processor 106 to extract the movements of the subjects and provide body data characterizing the subject movements. The subject can be a human, but in other examples, the subject can be a robot, an animal, or a different type of object that has a body and can experience movement. In some examples, facial expressions of the subject and subject body movements are captured by a single camera. In some examples, the facial data is provided based on a first subject's facial features and/or expressions, and the body data is provided based on a second subject's body movements. In some examples, similar video signal data is used for generating the facial and body data.

In some examples, image capture and/or extraction of facial expressions can be implemented by the first camera 103 and image capture and/or extraction of body movements of the subject can be implemented by the second camera 104. Thus, in some examples separate cameras can be utilized, such as first cameras 103 and second camera 104 for extraction of facial expressions and body movements of the subject.

In some examples, the facial features and/or expression can be captured simultaneously with the body movements of the subject. In other examples, the subjects facial features and/or expressions and/or body movements are captured independently, For example, the body movements of the subject (e.g., a dance) can be captured first, and facial expressions of the subject (e.g., singing with emotion) can be captured thereafter, or vice versa.

In some examples, the device 100 can include a communication device 110 that can be used to communicate with an other device 100n, which can be configured similarly to device 100, a server 160, and/or Internet 170 using a network 164. There can be an "n" number of other devices. The network 164 can include any type of network, for example, a local area network (LAN) (e.g., a Wi-Fi network), a cellular network, a Bluetooth network, an NFC network, a VPN network The communication device 110 can include, for example, a wired communication interface, wireless communication interface, a cellular interface, a near field interface, a Bluetooth® interface, a Wi-Fi component, and/or other communication components/interfaces to provide communication via other modalities. The device 100 can be used to upload data (e.g., the facial data, the body data, other types of data) or augmented videos to an online video platform over the Internet 170. In some examples, the device 100 can provide the facial and/or body data to the other device 100n, which can provide augmented video content based on the facial data and/or the body data.

Continuing with the example of FIG. 1, the device 100 can include a user interface 112 for receiving commands from the user of the device 100. The user interface 112 can include for example, a touchscreen device, a keyboard, a mouse, motion sensors, buttons, knobs, voice actuation, headset, hand recognition, gaze recognition, and/or the like.

The processor 106 can access the memory 108, a storage 161 on or coupled to the server 160, and/or a cloud based storage on the Internet 170. In some embodiments, the memory 108 or storage 161 can include a database of digital assets (e.g., CGI characters) on which the body movements and/or facial expressions of the subject can be mapped. As disclosed herein, after capturing body motion and/or facial expressions of the subject, a digital asset (or a number of assets) can be selected (e.g., using the interface 112) from the database. The body motion and/or facial expression of the subject can be mapped into the digital asset based on the body motion data and/or facial data. A user viewing the display 114 of the device 100 can see a CGI Character with actions (e.g., facial and/or body movements) mapped to the actor, in some examples, while the actor is being filmed, or at a later time. By way of further example, the actor can be recorded by the image sensor 102 and body movements and/or facial expressions of the actor can be extracted from captured images by the image sensor 102 and stored as data for later digital asset mapping, and/or placement of the digital asset with animations based on the mapping into virtual or other recorded environments.

Figure 2:
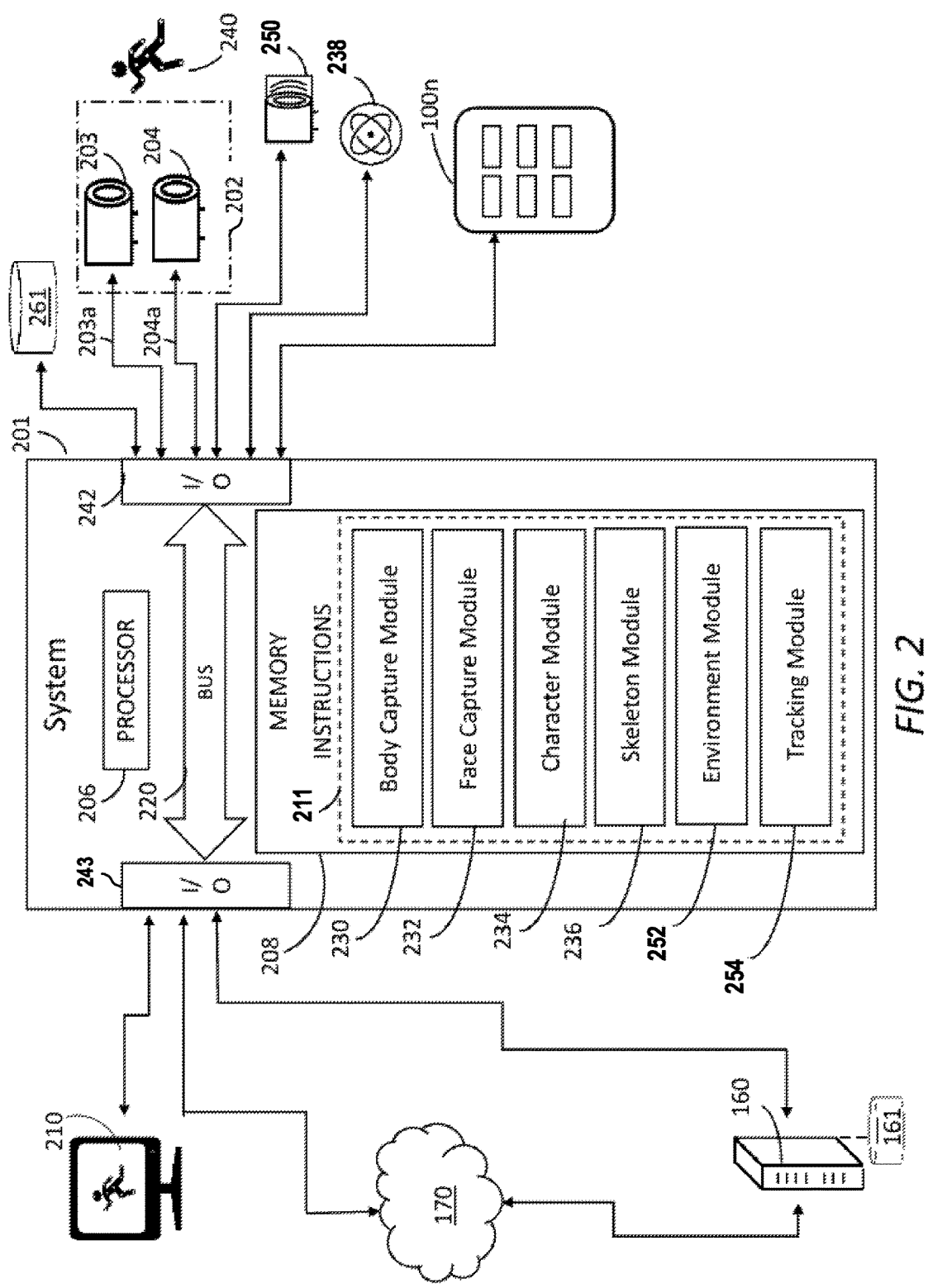
FIG. 2 is a block diagram of an example of an animation system.

FIG. 2 is a block diagram of an example of another animation system 200. The animation system 200 can include a processing system representing a computer system (or platform) 201, which is capable of implementing at least some of the functions/operations, as disclosed herein. While various components depicted in the system 200 of FIG. 2 are for purposes of illustrating aspects of the exemplary embodiment, and that other similar components, implemented via hardware, software, or a combination thereof, are capable of being substituted therein. The computer system 201 can be implemented, for example, as a desktop computer, a portable computer, a tablet, a mobile device (e.g., such as the device 100, as shown in FIG. 1), or as other known devices that can host a software platform and/or application. Because in some examples, the computer system 201 can be implemented as the device 100, reference can be made to the example of FIG. 1 in the example of FIG. 2. The computing platform 201 could be implemented in a computing cloud and on one or more servers including a server farm or cluster of servers. In such a situation, features of the computing platform 201 could be representative of a single instance of hardware or multiple instances of hardware with applications executing across the multiple instances (e.g., distributed) of hardware (e.g., computers, routers, memory, processors, or a combination thereof). Alternatively, the computing platform 201 could be implemented on a single dedicated server or workstation.

The computer system 201 includes a processor 206 and memory 208, which can be implemented similarly to the processor 106 and the memory 108, as shown in FIG. 1. The computer system 201 can provide augmented video data based on video data provided by an imaging sensor 202 of an environment with a digital asset (e.g., CGI character) embedded therein having animations based on body and/or facial data, as disclosed herein. In some examples, the augmented video data is provided based on environmental data, as disclosed herein. The augmented video data can be rendered on a display 210, as shown in FIG. 2. The computer system 201 can include a user interface 207 that allows a user to provide commands into the computer system 201 for controlling various components of the animation system 200, and in some instances, generation of the augmented video data. In some examples, the computer system 201 can include an operating system, for example, Windows®, Linux®, Apple®, Android® or any other type of operating system. In some embodiments, the computer system 201 includes a graphical processing unit (GPU) that can process the video data provided by an image sensor 202 for generation of the augmented video data. As shown in FIG. 2, the image sensor 202 can include any number of cameras, for example, cameras 203,204.

In the example of FIG. 2, components of the computer system 201 can be connected to a bus 220 to allow for exchange of data between the components, for example, for providing the augmented video data. For example, the processor 206 can communicate with a data storage 261 using a communication link 242. The cameras 203, 204 can provide respective video data using the communication link 242 to the processor 206. In some examples, the communications link 242 is a direct electrical wiring between the components. In some examples, the processor 206 can communicate with other components including a server 160, a cloud network 170 using a communication link 243. While each component is illustrated as connecting to the computer system 201 via one of the two illustrated communication links 242, 243, in other examples, a number of links 242, 243 can be used and any component can use a corresponding link for communication of data to the processor 206. Example communication links can include, for example, a proprietary communications network, infrared, optical, or other suitable wired or wireless data communication links. While the example of FIG. 2 illustrates the computer system 201 communicating directly with the server 160, in other examples, the computer system 201 can communicate with the server 160 using the network 170. In some examples, the network 170 is implemented similarly to the network 164, as shown in FIG. 1.

In some examples, the processor 206 can be configured to execute machine-readable instructions 211 stored in the memory 208 or at another memory location that is accessible by the processor 206. The machine-readable instructions 211 can include a body capture module 230 that can process video data from the image sensor 202, which can include video signals generated by the cameras 203 and/or 204. In some examples, the video signals can be referred to as raw video signals. A video signal can be characterized by a number of pixels supported horizontally (e.g., 1080P, also known as HD, 2K and BT.709). In some examples, the camera 203 provides a first video signal 203a with one or more images representative of the environment. For example, the first camera 203 can have a zoom and resolution defined or set for capturing body movements of a subject 240 (or actor) (e.g., feet, head, and everything between). The first video signal 203a can be provided as first video signal data to the body capture module 230 for processing.

In some examples, the machine-readable instructions 211 include a face capture module 232 that can also receive the first video data from the image sensor 202. In some embodiments, the face capture module 232 receives the first video signal data that is received by the body capture module 230. In some examples, the camera 204 provides a second video signal 203b with one or more images representative of the environment. The second video signal 203b can be provided as second video signal data to the face capture module 232 (or in some examples to the body capture module 230) for processing. The second camera 204 can have a zoom and resolution set or defined for capturing facial expressions of an actor within the frames of the video. Thus, in some examples, the zoom and resolution of the second camera 204 can be such that a face (e.g., a head) is captured at a level of detail so that facial expressions are captured. For example, a level of detail captured by the second camera 204 can be such that an eye position (or movements) of the subject 240 can be detected. Thus, features of the subject 240 that can be captured can include where the subject 240 is looking, how the subject 240 is speaking, and various emotions made by the subject 240.

The body capture module 230 can provide body data characterizing the body movements of the subject 240 based on the first video signal data (or in other examples, based on the second video signal data). The facial capture module 232 can provide facial data characterizing captured facial features and/or expressions of the subject 240 based on the second video signal (or in other examples, based on the first video signal data). For example, the body capture module 230 can extract the body movements of the subject 240 from the first video signal data, and the facial capture module 232 can extract the facial features and/or expressions of the subject 240 from the second video signal data.

In some examples, each capture module 230, 232 can be configured to change a video coding format of video signals from the image sensor 202. That is, the coding format of a video signal received from the image sensor 202 can be changed by the capture modules 230, 232 to a second format. The change in format may facilitate additional processing of the video signal. Examples of video coding formats include but are not limited to H.262 (MPEG-2 Part 2), MPEG-4 Part 2, H.264 (MPEG-4 Part 10), HEVC (H.265), Theora, RealVideo RV40, VP9, and AV1. In other examples, the capture modules 230, 232 can be configured to change a video codec of the video signal.

In yet still other embodiments, the capture modules 230, 232 can be configured to change a compression of the video signal from the image sensor 202. That is, the video signal can be compressed to make an associated file size smaller than its original format. In embodiments where the capture modules 230, 232 compresses the video signal, the processing of the video signal by the processor 206 and other devices can be faster compared to an uncompressed video signal. The capture modules 230,232 can also optimize performance characteristics of the video signal, for example and without limitation optimizing the number of frames per second (FPS), video quality, and resolution. The optimization may also allow the video signal to be processed in a more efficient and faster manner.

In some examples, the machine-readable instructions 211 can include a character module 234 that can retrieve digital assets (that can be referred to as characters, in some instances) and map selected digital assets to a skeleton model, as disclosed herein. The digital assets can be stored in a database on the storage device 261, or accessible to the character module 234 via cloud storage or a remote storage 161 in communication with server 160. The digital assets within the database can be defined as having a shape in two or three dimensions. For example, digital asset (e.g., a CGI character) can have a three-dimensional (3-D) body and predetermined dimensional scale (e.g., the CGI character can be configured to have a scaled size of about 50 meters tall with respect to the subject 240 in the augmented video data). In this way, the digital asset can appear much larger than the subject 240 when movements are mapped to the digital asset and inserted/incorporated into a video signal.

In some embodiments, digital assets can be uploaded directly or remotely (via the cloud 170 or remote server 160) and accessible by the character module 234. In some embodiments, the digital assets can include other assets beside characters, such as environments, props, set extensions, etc., and can also be stored in the database. In some embodiments, the character module 234 can be configured to change a level of detail (LOD) of the digital asset, for example, a geometry detail and pixel complexity of the digital asset. LOD techniques can be used to increase an efficiency of dimension rendering by decreasing a workload of graphic processing.

The machine-readable instructions 211 can include a skeleton module 236 that can animate a (virtual) skeleton or frame model of the subject 240 based on body movements and/or facial expressions captured by the cameras 203, 204 to provide an animated skeleton model. For example, the skeleton module 236 can receive the facial and/or body data to animate the skeleton or frame model to reflect the body movements and/or facial expressions captured by the cameras 203, 204. The skeleton module 236 can map the animated skeleton model to digital asset (provided by the character module 234) to animate the digital asset according to the body movements and/or facial expressions captured by the cameras 203, 204 of the subject 240. Thus, human actions (body movement and/or facial expression) that are recorded by the image sensor 202 can be animated by the digital asset in one or more dimensions (e.g., two or three dimensions) based on a mapping of the animated skeleton model to the digital asset.

In some examples, the digital asset includes a digital asset frame (e.g., a CGI frame) and digital asset joints. A digital asset frame is a single still image from an animation or video sequence that has been created using computer graphics. A frame can be thought of as a snapshot of a moment in time within the animation, and when combined with other frames, they create the illusion of motion. A joint is a connection point between two or more bones in a skeleton. In computer graphics, a joint is typically represented as a pivot point where the bones can rotate around, allowing for the movement of the skeleton. In an example, to map skeleton movements of the skeleton model to a digital asset frame, motion data (e.g., the body and facial data) captured using the cameras 203, 204 can be used to drive the movement of the virtual skeleton within a digital asset environment. The motion data can be processed and applied to the joints and bones of the virtual skeleton by the skeleton module 236, allowing for the movement of the digital asset to be animated in a realistic and believable way. The movement of the virtual skeleton can then be used by the skeleton module 236 to animate the digital asset frame by positioning and rotating the digital asset's joints and limbs to match a motion captured in a real-world environment.

In some examples, the body movements and facial expressions of the subject 240 are captured with disregard to the visual appearance of the subject 240, and combined movement data is mapped to a skeleton model or a frame so that the digital asset performs actions and facial expressions of the subject 240. In a filming context, if a user desires to create a video of a dancing character, the subject 240 can perform a dancing action that can be captured by the image sensor 202 and sent to the body capture module 230 and/or face capture module 232 for processing and thus provide the facial and/or body data. The skeleton module 236 receives the body data from the body capture module 230 extracts the dance movement as a frame or series of joints captured of the subject 240 and animates the digital asset having a corresponding frame or series of joints.

In some instances, the skeleton module 236 receives the captured body movement and facial expressions from the capture modules 230, 232 and combines extracted body data and facial data and generates composited subject data, which is a single data set for animating digital assets movements and expressions. In some instances, the skeleton module 236 can upload and/or store the composited subject data at a local storage 261 or remote storage 161 and later retrieve the composited actor data for generation of augmented video data. In some examples, the capture modules 230, 232, character module 234, and skeleton module 236 can cooperate to generate an augmented video signal that can be provided to the display 210 and/or stored for later viewing/sharing on an online video platform. The augmented video signal can include a video signal of the environment and the digital asset modeled over the subject 240. In this way, users of the system 200 can see a video of a digital asset moving in ways that the subject 240 moves.

In some embodiments, a system such as system 200 includes additional modules and hardware configured to virtually map an environment and determine a position of the cameras with respect to the environment. The additional data captured and processed allows for a unique filming experience of CGI Characters animated as described above. For example, a user of the system may walk around the real world physical location where the CGI Character is associated virtually, and then film the CGI Character mapped to the animation as if the CGI Character were actually in the real environment, like a real actor.

In some examples, the system 200 includes an environmental sensor 250 for capturing environmental data characterizing the environment. The environmental sensor 250 can scan the environment and determine local geometry and spatial configuration. For example, the environmental sensor 250 can capture depth points used for building a scaled virtual 3-dimensional model of the environment, which can be used for generating the augmented video data, as described herein. The environmental sensor 250 can be implemented, for example, as an infrared system, a light detection and ranging (LIDAR) system, a thermal imaging system, an ultrasound system, a stereoscopic system, an RGB camera, an optical system, and/or any device/sensor system that can measure depth and distance of objects in an environment.

By way of further example, the environmental sensor 250 can include an infrared emitter and sensor. Infrared emitters project a known pattern of infrared dots into the environment, dots that are not within the visible spectrum of the human eye. The projected dots can be photographed by either an infrared sensor or image camera 203, 204 for analysis. In some embodiments, the environmental sensor 250 can include a LIDAR based system, which can project a pulsed laser (signal) into the environment, and an amount of time it takes for a laser signal to return is used to generate a 3-D model of the environment. In some examples, any sensor system or combinations of sensor systems can be utilized as the environmental sensor 250.

In some examples, the system 200 can include a motion sensor 238 to detect an orientation of the device 100 and/or cameras 203, 204. In some examples, the cameras 203, 204 are integrated into a device, such as the device 100. Thus, examples herein related to measuring and determining environmental features and orientation and position data of a device can include detecting the orientation and position of the cameras 203, 204, in the environment. The motion sensor 238 may be a sensor or combination of sensors, which are able to detect motions, orientations, acceleration and positioning of the device 100 and or cameras 203, 204. The motion sensor 238 can be variously embodied as a gravity sensor, accelerometer, gyroscope, magnetometer, and the like, or combinations therefore. For example, the motion sensor 238 can be an inertial measurement unit (IMU), which can correspond to a sensing unit that can include an accelerometer, gyroscope, and a magnetometer. In this way, an animation system 200, with reference to an origin, can calculate a position and orientation of the cameras 203, 204 in relation to the generated 3-D model of the environment.

In some examples, the machine-readable instructions 211 can include an environmental module 252 that can receive environmental data from the environmental sensor 250. The environmental module 252 processes the environmental data and locates objects and/or points and determines a distance between those objects and/or points for the environment. The environmental module 252 uses the environmental data generated by the environmental sensor 250 to create a 3-D model/mesh of the environment. In some embodiments, the environmental module 252 employs photogrammetry algorithms to generate the 3-D model of the environment using one of or a combination of the video signals generated by the camera and environmental data generated by the environmental sensor 250. For example, multiple photographs from an image sensor or a data sensor may be stitched together to build a 3-dimensional model of the environment. In other embodiments, point data, e.g. a point cloud, generated from the points observed in the real environment (either object features or infrared point illumination) is converted to a mesh (polygon or triangle mesh) model representing the real environment. In other embodiments, neural radiance fields (NeRF) are used to generate the 3-D model of the environment using one of or a combination of the video signals generated by the camera and environmental data generated by the environmental sensor.

In some examples, the machine-readable instructions 211 can include a tracking module 254 to determine the position of the device 100 and/or cameras 203, 204 with respect to the real environment and 3-D model generated by the environmental module 252. The tracking module 254 receives spatial tracking data from the motion sensor 238 positioned/associated with a device and/or cameras. In this way, as the camera operator moves to capture different angles of or within the environment the calculated movement by the tracking module can be accounted for in the display of the digital asset in real time. In other words, the tracking of the device 100 and/or cameras 203, 204 ensures that while the environment and perspective of the camera is changing, the digital asset remains in a selected position, although viewed with respect to the changed camera perspective.

In some examples, the body capture module 230, face capture module 232, character module 234, skeleton module 236, environment module 252 and tracking module 254 cooperate (or work together) to generate an augmented video signal that is provided to the display 210 that can be recorded, stored and shared as an animated production video. That is, the real-time animated video signal includes a video signal captured by a camera with the digital asset appearing as being placed or within the real environment.

Figure 3:
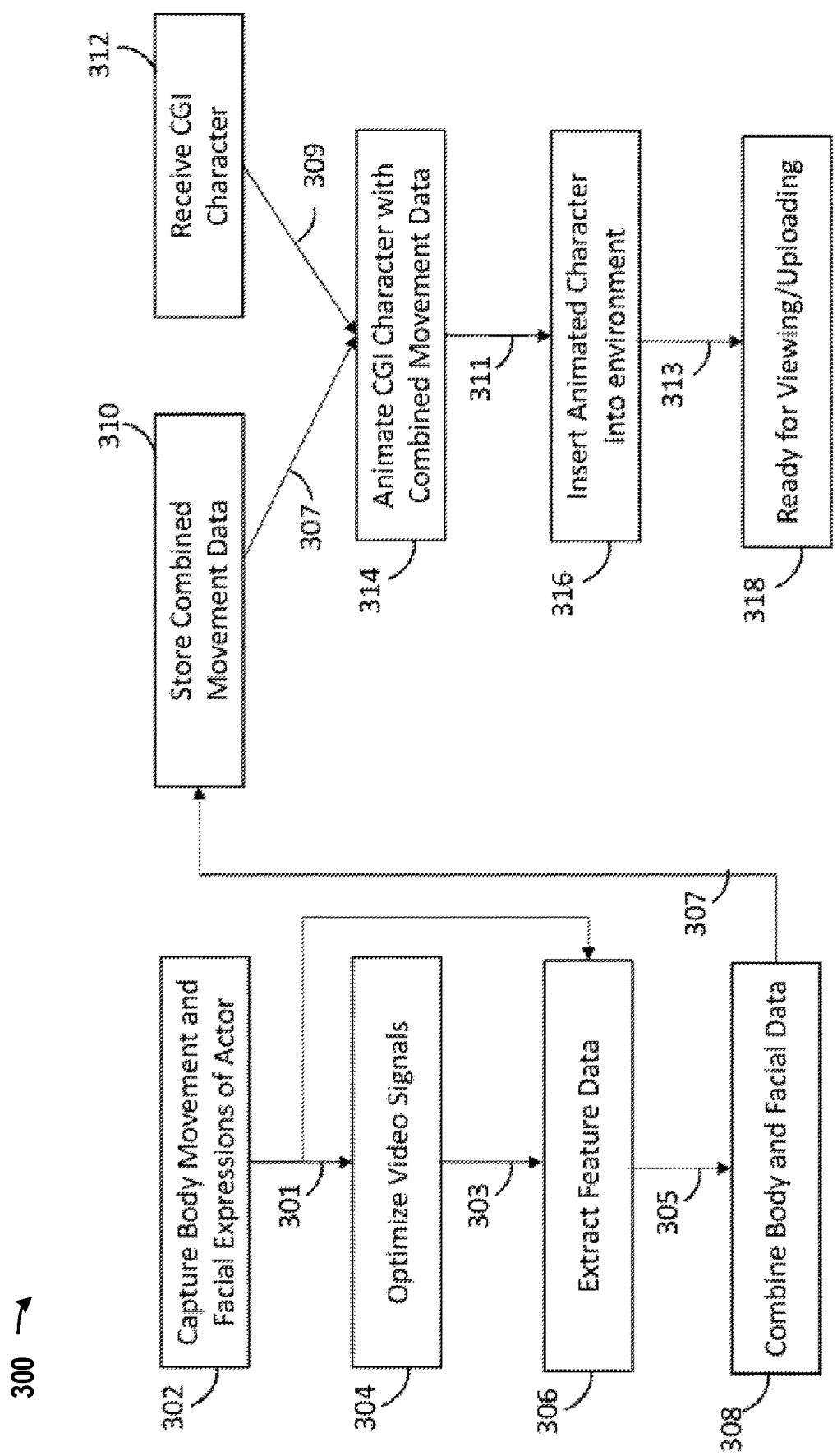
FIG. 3 is flowchart diagram of a method for providing animated video.
Figure 4:
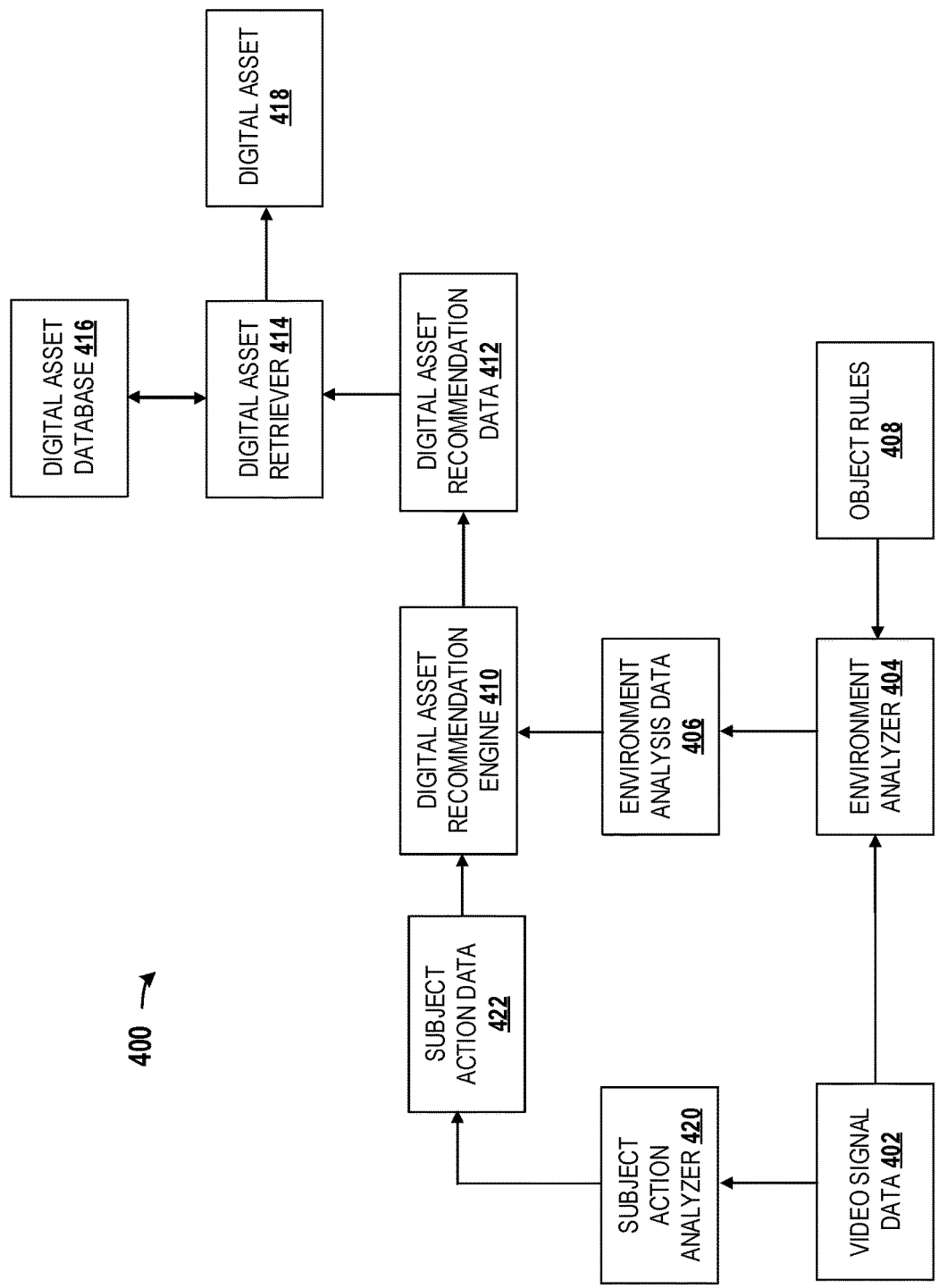
FIG. 4 is a block diagram of a digital asset recommendation system that can be used in one of the animation systems, for example, as shown in FIGS. 1-2.

In view of the foregoing structural and functional features described above, example methods will be better appreciated with reference to FIGS. 3-4. While, for purposes of simplicity of explanation, the example methods of FIG. 3-4 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods.

FIG. 3 is flowchart diagram of a method 300 for providing animated video that can be performed by a system, such as system 10, as shown in FIG. 1, or the system 200, as shown in FIG. 2. Thus, reference can be made to the example of FIGS. 1-2 in the example of FIG. 3. The method 300 can begin at 302 by capturing (e.g., using the image sensor 102, as shown in FIG. 1, or the image sensor 202, as shown in FIG. 2) the body movement and facial expressions of a subject (e.g., the subject 240, as shown in FIG. 2). In some examples, separate cameras can be used to capture the body movements and facial expressions or a same camera can be used. In some instances, the body movement and facial expressions of the actor can be captured simultaneously or at different times. The body movement and facial expression of the subject can be captured and provided as video signal data, for example, as disclosed herein.

The video signal data corresponding to the body movement and facial expressions of the actor can be expressed as video signal data 301, as shown in FIG. 3. At 304, the video signal can be processed to optimize the video signal data. Such processing includes optimizing the video signal data for additional processing including but not limited to changing the compression, format, codec, and the like. The optimization at 304 can provide optimized signal data 304, which can allow for faster subsequent processing. Processing can be performed, for example, by capture modules 230, 232. In some examples, step 304 can be omitted from the example method 300.

At 306, body movements and facial expressions can be extracted from the video signal data 301 (or optimized video signal data 303). For example, the skeleton module 236, as shown in FIG. 2, receives the video signal data 301 or 302 from the capture module 232 and extracts feature data as a frame or series of joints captured from the subject 240 to provide extracted feature data 305. The extracted feature data 305 representative of the body movements and/or facial expressions can be configured for additional processing. In some examples, the extracted feature data 305 corresponds to or includes the body and/or facial data, as disclosed herein.

At 308, the feature data representative of body movements and facial expressions can be combined to create a combined set of feature data 307. In some embodiments, the combined feature data 307 is further processed by the method and associated system, e.g., the system 200. In some embodiments, the combined feature data 307 can be stored at 310 either within the memory of a user device (such as the device 100, as shown in FIG. 1) or may be stored within the cloud or on a remote storage device (e.g., as disclosed herein). At 312, an associated system (e.g., the system 200) retrieves a digital asset from an accessible database; either stored on the device or stored remotely, which can be referred to as digital asset data 309 (referred to as CGI character data 309 in the example of FIG. 3). The digital asset data 309 can include character frame and/or joint elements configured for association with the combined feature data 307 extracted from the body and facial expressions.

At 314, the combined feature data 307 can be mapped to the digital asset data 309 creating a digital asset animation (or animated digital asset) 311. For example, arm movements captured and extracted can be mapped to the digital asset such that the digital asset mimics the captured arm movements. The result is that the digital asset is now animated with the movements and facial features captured of the subject without the need for traditional motion capture systems (e.g., with motion capture suits and the utilization of markers).

In some examples, at 316 of the method 300, the animated digital asset 311 is inserted into an environment. In some instances, an environment is a CGI background such as a static image and/or animated background. In other embodiments, the animated digital asset 311 is inserted into a recorded or on-going (or real-time) video feed captured by an image sensor of the system, such as the image sensor 202 of the system 200, as shown FIG. 2. In some examples, the system 200 can include other sensors, such as an environmental sensor configured to map the filmed environment and desirably scale the animated digital asset 311 within the filmed environment. In this manner, the animated digital asset 311 can be reused by inserting the character into a variety of environments to create different videos.

In some examples, at 318 an animated production video 313 including the background (environment/virtual) and the animated digital asset 311 scaled therein is watchable as video content e.g., on a display, for example the display 210, as shown FIG. 2. It is to be appreciated that this process 300 may occur during filming and the animated digital asset 311 can overlay the actor in a viewfinder display of the capture device. The animated production video 313 may also be captured, recorded and saved to a storage device, such as the store devices mentioned above or the video animation may be uploaded/shared to an online video platform.

FIG. 4 is a block diagram of a digital asset recommendation system 400 that can be used in one of the animation systems, such as shown in FIGS. 1-2. The system 400 can be implemented on a computing device/platform, such as device 100, as shown in FIG. 1, or the system 201, as shown in FIG. 2, the device 100n, as shown FIGS. 1-2, or on the server 160, as shown in FIGS. 1-2. Thus, reference can be made to the examples of FIGS. 1-2 in the example of FIG. 4. In some examples, the system 400 can be implemented in a cloud environment, or as a pay-for-use service on an Internet (e.g., the Internet 170, as shown in FIG. 1).

The system 400 can be used to provide digital asset recommendations to a user (or director, if used in a film/television application context). The digital asset recommendation can include, for example, a type of digital asset, attributes of the digital asset (e.g., clothing, weapons, size, color, shape, shade, etc.). The system 400 can provide the digital asset recommendations based on video signal data 402. The video signal data 402 can be provided by one or more cameras, for example, the cameras 203, 204, as shown in FIG. 2. The video signal data 402 can include a number of video frames generated by the one or more cameras of an environment. In some examples, the environment can include a subject (e.g., the subject 240, as shown in FIG. 2).

The system 400 can include an environment analyzer 404. The environment analyzer 404 can evaluate the video signal data 402 to detect or identify features from the environment and provide the detected/identified features as environment analysis data 406. For example, the environment analyzer 404 can employ an objection detection technique to identify and localize objects within the video signal data 402. In some examples, the environment analyzer 404 uses a convolution neural network (CNN) model trained for image detection and thus objection detection, or a different type of machine-learning (ML) model that has been trained for image detection. The type of objects that can be detected using object detection algorithms by the environment analyzer 404 can depend on training data used for training the ML model. The environment analyzer 404 can detect objects and classify the objects into different categories based on appearance and characteristics. The type of objects identified by the environment analyzer can include, for example, people, vehicles, animals, furniture, electronics, buildings, landmarks, food, tools, sports equipment, and other types of objects.

In some examples, the environment analyzer 404 can identify objects according to object rules 408. The object rules 408 can define or specify types (or particular) objects that the environment analyzer 404 should detect. The object rules can be provided by another system, software, or based on user input (at an input device, for example, user interface, such as the user interface 112, as shown FIG. 1). Thus, the object rules 408 can tailor or modify the environment analyzer 404 so as to exclude certain objects from being identified. For example, if the environment is a beach, the object rules 408 can be used to exclude buildings from consideration and thus improve efficiency and speed at which the environment analyzer 404 provides the environment analysis data 406. By using the object rules 408, the environment analyzer 404 can be modified/configured to minimize or reduce false positives being included in the environment analysis data 406, and thus improve an overall accuracy at which the digital asset recommendations are provided by the system 400. In some examples, once an object has been detected, its features can be extracted for further analysis and provided as part of the environment analysis data 406. This can be done using techniques such as feature extraction, which involves analyzing the object's appearance and extracting relevant features such as color, texture, and shape.

The system 400 can include a digital asset recommendation engine 410. The digital asset recommendation engine 410 can process the environment analysis data 406 to provide digital asset recommendation data 412. For example, the digital asset recommendation engine 410 can evaluate the identified objects in the video signal data 402 using the environment analysis data 406 to predict digital assets that are most relevant for the environment.

In some examples, the engine 410 uses machine learning (ML) algorithms (e.g., a trained ML model) that has been trained to process identified objects/object characteristics from video data. For example, the ML algorithm of the engine 410 can be trained to analyze features of the objects to make digital asset predictions. For example, if the video data includes a ship, the ML algorithm could be trained to analyze the features (e.g., properties and attributes) of the ship and recommend one or more potential digital assets that can be used (e.g., a sailor, a fish, other types of sea-creatures. The ML algorithm of the engine 410 can be implemented as a deep neural network model, a decision tree model, an ensemble model, or a different type of ML model. Thus, the ML algorithm can be trained on a number of objects for which most relevant digital assets (e.g., CGI assets) have been identified. Accordingly, the digital asset recommendation data 412 can identify a number of digital assets that are most relevant for the environment.

For example, during filming (production), the system 400 can identify digital assets that can be needed for a scene eliminating the need for searching and identifying assets that can be used in the scene. Thus, once a creative direction of scene has been determined, the system 400 can be used to identify potential digital assets that match the creative direction of the scene.

The system 400 can include a digital asset retriever 414. The digital asset retriever 414 can be used to query or search a digital asset database 416 based on the digital asset recommendation data 412 to provide one or more digital assets 418. The digital asset database 416 can include a number of pre-built digital assets. In some examples, the digital asset retriever 414 can evaluate a technical feasibility during digital asset identification from the digital asset database 416. For example, the digital asset retriever 414 can considering factors, such as an asset's complexity, a polygon count, a level of detail, and/or assess whether a digital asset (identified by the data 412) can be rendered efficiently within the environment without impacting performance. In some examples, the digital asset retriever 414 can optimize one or more selected digital assets. For example, the digital asset retriever 414 can simplify the asset's geometry, reduce texture resolution, and/or adjust the level of detail to ensure that it is optimized for performance. In some examples, the digital asset retriever 414 can render the digital asset recommendation data 412 on an output device (e.g., display) and a user can select which assets are provided as the one or more digital assets 418. Once, the one or more digital assets 418 are provided, these assets can be supplied to a compositor (e.g., a module, application, dedicated hardware/device) for compositing with one or more images of the environment to provide augmented video data, which can be rendered on the same or different output device.

In some examples, the video signal data 402 can be received by a subject action analyzer 420, which can analyze the video signal data 402 to detect or identify actions (e.g., body or facial movements) of the subject in the environment. The subject action analyzer 420 can provide subject action data 422 identifying the actions of the subject. In some examples, the subject action analyzer 420 can use a ML trained to process video of a human making movements to detect the types of movement. The subject action analyzer 420 can use action recognition techniques to identify specific actions being performed by the subject in the video signal data 402. In some examples, the ML algorithm of the subject action analyzer 420 is trained CNN, but other types of ML models can be used as well. For example, the ML algorithm can be trained on preprocessed videos (with human motion and appearance of the person) to learn the patterns and features that distinguish between different actions.

In some examples, the ML algorithm of the subject action analyzer 420 can be trained to measure or determine an amount of hand motion, and/or identify/interpret specific gestures made by a person. The subject action analyzer 420 can provide the subject action data 422 characterizing the measured amount of hand motion and/or a type of gesture being made by the subject. The subject action analyzer 420 can use computer vision algorithms to track a position and a movement of a hand of the subject in 3D space over time (e.g., in the environment). The amount of hand motion can then be calculated based on the distance traveled by the hand, the speed of movement, or other similar metrics by the subject action analyzer 420. In some examples, the ML algorithm of the subject action analyzer 420 can be trained to recognize and classify specific hand gestures, such as waving, pointing, or making a fist. The amount of hand motion can then be measured based on the number or frequency of gestures made by the subject action analyzer 420. In some examples, the subject action analyzer 420 can analyze hand pose and shape of the subject. The subject action analyzer 420 can use computer vision algorithms to analyze the pose and shape of the hand, including the position of the fingers and the curvature of the palm. The amount of hand motion can then be measured based on the degree of change in hand pose or shape over time by the subject analyzer 420.

In some examples, the subject action analyzer 420 can use computer vision algorithms to track a movement of one or more arms of the subject in the video signal data 402. For example, the subject action analyzer 420 can identify an arm and separate (e.g., segregate) it from a background (e.g., the rest of the environment). This can be done using techniques, for example, such as background subtraction, edge detection, and/or color segmentation. The subject action analyzer 420 can track the movement of the arm by tracking a position and orientation of the arm (e.g., after segregation) in each frame of the video signal data 402, which can be provided as tracking data. For example, the subject action analyzer 420 can use techniques such as optical flow, feature tracking, and/or template matching. The subject action analyzer can determine the motion of the arm by calculating motion parameters of the arm, such as velocity, acceleration and/or trajectory based on the tracking data. For example, the subject action analyzer 420 can use one or more mathematical models and equations, or a ML algorithm trained for calculating arm motion based on tracking data. The subject action analyzer 420 can provide the subject action data 422 characterizing the amount of arm motion of the subject.

In some examples, the subject action analyzer 420 can determine a degree of freedom (DOF) of the arm of the subject. The subject action analyzer 420 can provide the subject action data 422 characterizing the DOF of the arm of the subject. For example, the subject action analyzer 420 can use computer vision algorithms to track a position and orientation of each joint in the arm to provide the tracked data. In one example, small markers can be attached to the joints of the arm, and positions of the small markers can be tracked using the computer vision algorithms. The position and orientation of each joint can then be calculated by the subject action analyzer 420 to provide the tracked data based on the relative positions of the markers. In some examples, computer vision algorithms can be used to track features of the arm, for example, contours of a skin or edges of bones. The subject action analyzer 420 can compute/determine a position and orientation of each joint to provide the tracked data based on the location of these features. In other examples, depth sensors or stereo cameras (in some instances, as disclosed herein, such as the cameras 203 and/or 204) can be used to capture a 3D position (3D coordinates) of each joint in each arm. The subject action analyzer 420 can determine the position and orientation of each joint based on the 3D coordinates to provide the tracked data. Once the position and orientation of each joint in the arm have been tracked, the DOF can be calculated by the subject action analyzer 420 by analyzing the relative motion of the joints. For example, the subject action analyzer 420 can use mathematical models and equations, or by applying an ML algorithm to the tracked data.

In some examples, the digital asset recommendation engine 410 can receive the subject action data 422 and provide the digital asset recommendation data 412. For example, the digital asset recommendation engine 410 can include a ML algorithm trained to identify potential or most relevant digital assets that can be used based on the subject action data 422. The ML algorithm can correspond to one of the ML models, as disclosed herein, or a different type of ML algorithm that can be trained to identify relevant digital assets based on different types of subject actions (e.g., facial and body movements), hand motions, hand gestures, arm motions, and/or DOF of an arm. For example, the engine 410 can identify a CGI asset with arms allowing for similar of DOF as the subject based on the subject action data 422. Thus, the engine 410 can identify CGI assets that are most likely to mimic the DOF (and thus movement capabilities) of the arm of the subject. Accordingly, CGI assets can be identified that provide more realistic and lifelike motion reflected in arm movements of the subject.

Accordingly, the system 400 can identify most relevant digital assets for digital composition (e.g., insertion into an environment). The system 400 can reduce a likelihood that improper or wrong CGI assets are selected for a particular scene or environment. Furthermore, the system 400 identifies CGI assets that are most likely to mimic (as closely as possible) actions/behaviors of the subject for the scene or environment, or a different use/application.

Figure 5:
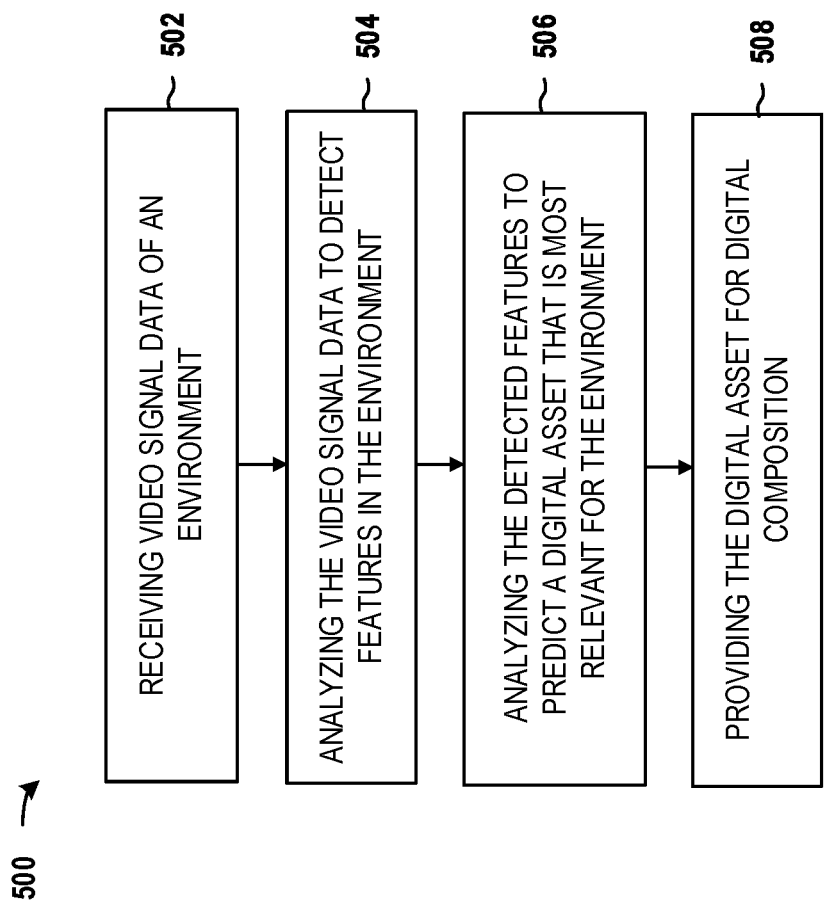
FIG. 5 is flowchart diagram of an example of a method for digital asset recommendation.

FIG. 5 is another example of a method 500 for digital asset recommendation. The method 500 can be implemented by the system 400, as shown in FIG. 4. Thus, reference can be made to FIGS. 1-4 in the examples of FIG. 5. The method 500 can begin at 502 by receiving video signal data (e.g., the video signal data 402, as shown in FIG. 4) that includes a number of video frames generated by one or more cameras of an environment. At 504, the video signal data can be analyzed (e.g., by the environment analyzer 404, as shown in FIG. 4) to detect or identify features from the environment, which can be provided as environment analysis data (e.g., the environment analysis data 406, as shown in FIG. 4). The features can include one or more objects in the environment. In some examples, the analyzing step at 504 is implemented according to object rules (e.g., the object rules 408, as shown in FIG. 4). At 506, the identified features in the video signal data 402 can be evaluated (e.g., by the digital asset recommendation engine 410, as shown in FIG. 4) using the environment analysis data to predict a digital asset (e.g., a CGI character) that is most relevant for the environment. At 508, in some examples, the digital asset can be provided for digital compositing/rendering.

Figure 6:
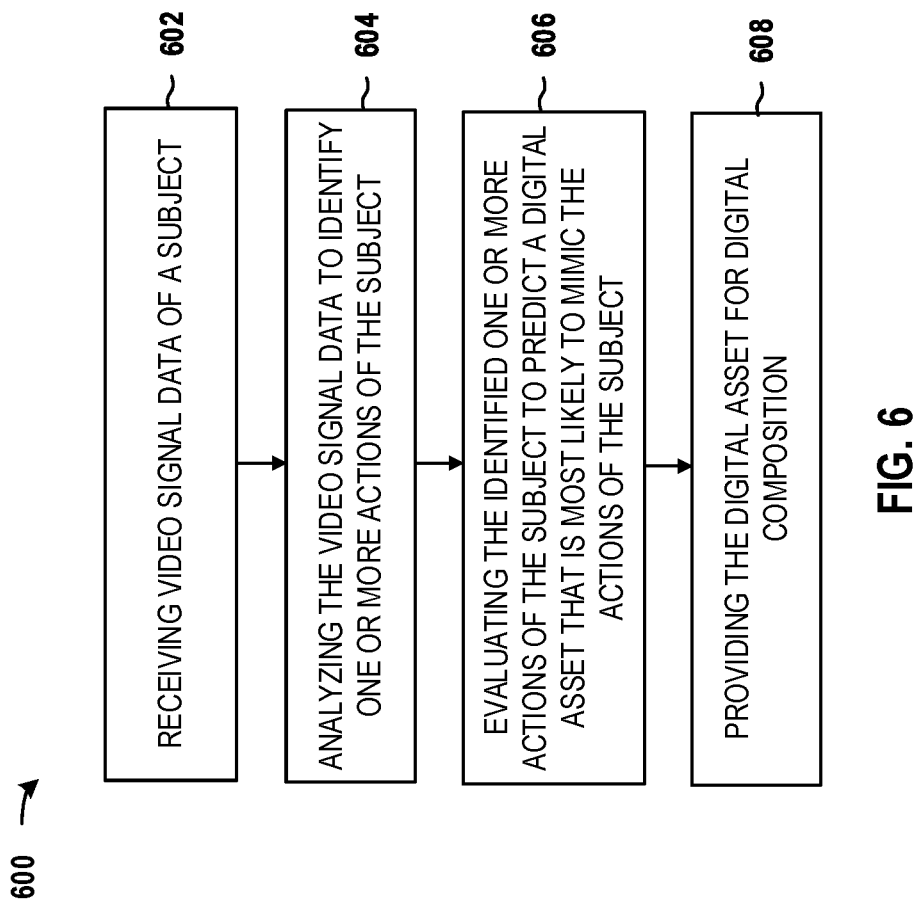
FIG. 6 is flowchart diagram of another example of a method for digital asset recommendation.

FIG. 6 is another example of a method 600 for digital asset recommendation. The method 500 can be implemented by the system 400, as shown in FIG. 4. Thus, reference can be made to FIGS. 1-4 in the examples of FIG. 6. The method 600 can begin at 602 by receiving video signal data (e.g., the video signal data 402, as shown in FIG. 4) that includes a number of video frames generated by one or more cameras of a subject. At 604, the video signal data can be analyzed (e.g., by the subject action analyzer 420, as shown in FIG. 4) to identify one or more actions (e.g., body and/or facial movements) of the subject, which can be provided as subject action data (e.g., the subject action data 422, as shown in FIG. 4). In some examples, the one or more actions include one or more arm and/or hand movements. At 606, the subject action data can be evaluated (e.g., by the digital asset recommendation engine 410, as shown in FIG. 4) to predict a digital asset (e.g., a CGI character) that is most likely to mimic the actions of the subject (e.g., correctly, or within a degree or percentage of the subject). At 608, in some examples, the digital asset can be provided for digital compositing/rendering.

One or more illustrative embodiments incorporating aspects of the presently disclosed invention are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having the benefit of this disclosure.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se).

As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The term "software," as used herein, is intended to encompass any collection or set of instructions executable by a computer or other digital system to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

As used herein, the term "or" is intended to be inclusive, rather than exclusive. Unless specified otherwise, "X employs A or B" is intended to mean any of the natural incisive permutations. That is, if X employs A; X employs B; or X employs both A and B, the "X employs A or B" is satisfied. Additionally, the articles "a" or "an" should generally be construed to mean, unless otherwise specified, "one or more" of the respective noun. As used herein, the terms "example" and/or "exemplary" are utilized to delineate one or more features as an example, instance, or illustration. The subject matter described herein is not limited by such examples. Additionally, any aspects, features, and/or designs described herein as an "example" or as "exemplary" are not necessarily intended to be construed as preferred or advantageous. Likewise, any aspects, features, and/or designs described herein as an "example" or as "exemplary" is not meant to preclude equivalent embodiments (e.g., features, structures, and/or methodologies) known to one of ordinary skill in the art.

Understanding that is not possible to describe each and every conceivable combination of the various features (e.g., components, products, and/or methods) described herein, one of ordinary skill in the art can recognize that many further combinations and permutations of the various embodiments described herein are possible and envisaged. Furthermore, as used herein, the terms "includes," "has," "possesses," and/or the like are intended to be inclusive in a manner similar to the term "comprising" as interpreted when employed as a transitional word in a claim.

What have been described above are examples. It is, of course, not possible to describe every conceivable combination of components or methods, but one of ordinary skill in the art will recognize that many further combinations and permutations are possible. Accordingly, the present disclosure is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means "based at least in part on."

As used herein, the terms "generally" and "substantially" are intended to encompass structural or numeral modification, which do not significantly affect the purpose of the element or number modified by such term.

As used herein, the term "raw video signal," means a video signal that is obtained directly from an image sensor of a camera, e.g., capturing the environment and actors within a field of view. The term "animated video signal" means a video signal that includes a combination of the raw video signal and a CGI Character mapped to captured movement of an actor within a field of view.

The invention claimed is:

1. A method for animating a digital asset during filming or production of a film comprising:
   receiving, by a processor, first video signal data capturing a facial feature and/or expression of a subject for mapping onto a digital asset, the first video signal data being generated by a camera of a first portable device;
   extracting, by the processor, the facial feature and/or expression of the subject from the first video signal data to provide facial data;
   receiving, by the processor, second video signal data capturing a body movement of the subject for the mapping onto the digital asset, the second video signal data being generated by a first camera of a second portable device or a second camera of the second portable device;
   extracting, by the processor, the body movement of the subject from the second video signal data to provide body data;
   retrieving, by the processor, digital asset data for a digital asset from a digital asset database;
   generating, by the processor, a digital asset animation of the digital asset based on the facial data, the body data, and the digital asset data to map the facial feature and/or expression and/or body movement onto the digital asset; and
   causing, by the processor, augmented video data to be generated in real-time during the filming or production of the film based on video footage of an environment and the digital asset animation, wherein the augmented video data is provided to one or more displays for viewing.

2. The method of claim 1, wherein the digital asset animation comprises an animated skeleton model.

3. The method of claim 1, wherein the first video signal data of the subject is received during a first period of time and the second video signal data of the subject is received during a second period of time that does not overlap with the first period of times.

4. The method of claim 3, wherein the facial feature and/or expression of the subject and the body movement of the subject are captured simultaneously.

5. The method of claim 4, wherein the first video portable device is a first mobile phone and the second video portable device is a second mobile phone.

6. The method of claim 1, further comprising:
   querying, by the processor, the digital asset database to retrieve the digital asset data for the digital asset, the digital asset being defined by digital asset joints, and
   wherein the generating comprises associating the digital asset joints to joints of a skeleton model to map actions of the skeleton model onto the digital assets.

7. The method of claim 1, further comprising:
   generating, by the processor, composited subject data characterizing an animation of the digital asset based on the mapping; and
   causing, by the processor, the composited subject data to be stored on a remote server.

8. The method of claim 7, wherein the stored composited subject data is retrieved after a given amount of time of being stored on the remote server for use on an online video platform.

9. The method of claim 1, wherein the augmented video data is further generated based on spatial tracking data from a motion sensor so when a perspective of a camera providing the video footage of the environment changes from a first perspective to a second perspective the digital asset remaining in a given position.

10. The method of claim 9, wherein the augmented video data is provided at a viewfinder during the filming or production of the film.

11. A method for animating a digital asset during filming or production of a film comprising:

receiving, by a processor, first video signal data characterizing a facial feature and/or expression generated by a video camera of a first portable device;

receiving, by the processor, second video signal data characterizing a body movement generated by a first camera or second camera of a second portable device, wherein the first and second video signal data do not include markers to track the related facial feature, expression, or body movement;

extracting, by the processor, the facial feature and/or expression from the first video signal data to provide facial data;

extracting, by the processor, the body movement from the second video signal data to provide body data;

mapping, by the processor, the body movement and/or facial feature and/or expression to a skeleton model based on the facial and/or body data to provide an animated skeleton model;

retrieving, by the processor, digital asset data for a digital asset from a digital asset database;

animating, by the processor, the digital asset based on the digital asset data and the animated skeleton model to provide a digital asset animation;

generating, by the processor, augmented video data during the filming or production of the film based on a video footage of an environment and the digital asset animation, wherein the augmented video data is rendered on a display.

12. The method of claim 11, wherein the augmented video data is rendered on another display during the filming or production of the film.

13. The method of claim 11, wherein the first and second video signal data are provided by different types of portable devices.

14. The method of claim 11, wherein the first and second video signal data is generated non-simultaneously.

15. A method for animating a digital asset during filming of a film comprising:

receiving, by a processor, first video signal data capturing a facial feature and/or expression of a first subject for mapping onto a digital asset, the first video signal data being generated by a camera of a first portable device during filming;

extracting, by the processor, the facial feature and/or expression of the first subject to provide facial data;

receiving, by the processor, second video signal data capturing a body movement of a second subject during filming;

extracting, by the processor, the body movement of the second subject to provide body data;

mapping, by the processor, the captured facial feature and/or expression and the captured body movement onto a skeleton model based on the facial data and the body data to provide an animated skeleton model;

retrieving, by the processor, digital asset data for a digital asset from a digital asset database;

providing, by the processor, a digital asset animation based on the digital asset data and the animated skeleton model;

causing, by the processor, augmented video data to be generated during the filming of the film based on video footage of a scene and the digital asset animation, wherein the augmented video data is provided to one or more displays for viewing.

\* \* \* \* \*